US008723917B2

(12) United States Patent
Ohki

(10) Patent No.: US 8,723,917 B2
(45) Date of Patent: May 13, 2014

(54) IMAGE PROCESSING APPARATUS, IMAGE PROCESSING METHOD AND PROGRAM

(75) Inventor: Mitsuharu Ohki, Tokyo (JP)

(73) Assignee: Sony Corporation, Tokyo (JP)

( * ) Notice: Subject to any disclaimer, the term of this patent is extended or adjusted under 35 U.S.C. 154(b) by 499 days.

(21) Appl. No.: 12/648,881

(22) Filed: Dec. 29, 2009

(65) Prior Publication Data

US 2010/0171810 A1 Jul. 8, 2010

(30) Foreign Application Priority Data

Jan. 7, 2009 (JP) ................................ P2009-001250

(51) Int. Cl.
*H04N 5/262* (2006.01)

(52) U.S. Cl.
USPC ............................................. 348/36; 382/284

(58) Field of Classification Search
CPC .......................... G06T 2200/32; G06T 3/4038
USPC ............. 348/36, 282, 218, 904; 382/262, 284
See application file for complete search history.

(56) References Cited

U.S. PATENT DOCUMENTS

| | | | | |
|---|---|---|---|---|
| 6,657,667 B1 * | 12/2003 | Anderson | ................ | 348/333.12 |
| 6,704,041 B2 * | 3/2004 | Katayama et al. | .............. | 348/36 |
| 7,010,158 B2 * | 3/2006 | Cahill et al. | .................. | 382/154 |
| 7,064,783 B2 * | 6/2006 | Colavin et al. | ............. | 348/231.3 |
| 7,133,571 B2 * | 11/2006 | Cheatle | .......................... | 382/282 |
| 7,259,784 B2 * | 8/2007 | Cutler | ........................ | 348/223.1 |
| 7,424,218 B2 * | 9/2008 | Baudisch et al. | ............. | 396/322 |
| 7,639,897 B2 * | 12/2009 | Gennetten et al. | ............ | 382/299 |
| 2006/0182437 A1 * | 8/2006 | Williams et al. | .............. | 396/429 |
| 2006/0268130 A1 * | 11/2006 | Williams et al. | .............. | 348/239 |
| 2007/0025723 A1 * | 2/2007 | Baudisch et al. | ............. | 396/287 |
| 2007/0084927 A1 * | 4/2007 | Itou et al. | ....................... | 235/454 |
| 2007/0122039 A1 * | 5/2007 | Zhang et al. | .................. | 382/199 |
| 2007/0172151 A1 * | 7/2007 | Gennetten et al. | ............ | 382/299 |
| 2008/0111831 A1 * | 5/2008 | Son et al. | ....................... | 345/629 |

(Continued)

FOREIGN PATENT DOCUMENTS

| | | |
|---|---|---|
| JP | 2000-299804 | 10/2000 |
| JP | 2002-208005 | 7/2002 |

(Continued)

OTHER PUBLICATIONS

Japanese Application No. 2009-001250 Office Action dated Nov. 13, 2012.

*Primary Examiner* — Sath V Perungavoor
*Assistant Examiner* — Jeffery Williams
(74) *Attorney, Agent, or Firm* — Finnegan, Henderson, Farabow, Garrett & Dunner LLP

(57) ABSTRACT

An image processing apparatus includes a first image processor receiving, as a sequence of images, a plurality of images captured by sequentially shifting a shooting position in a predetermined direction, and setting a first overlapping area overlapping a priority area which is to be used preferentially in the sequence of images, as a use-prohibited area with respect to images in the sequence of images other than the first image, the images including the first overlapping area; a second image processor setting a second overlapping area of a second or third image as a use-prohibited area, the second and third images having sequence orders being separated by a predetermined spacing in the sequence of images; and an image generator generating an output image using areas of the plurality of images included in the sequence of images, excluding areas set as the use-prohibited areas by the first and second image processors.

7 Claims, 17 Drawing Sheets

(56) References Cited

U.S. PATENT DOCUMENTS

2009/0058990 A1* 3/2009 Kim et al. .................. 348/36
2009/0262180 A1* 10/2009 Kim et al. .................. 348/36
2010/0172589 A1* 7/2010 Ohki .......................... 382/203

FOREIGN PATENT DOCUMENTS

| | | |
|---|---|---|
| JP | 2005-175620 | 6/2005 |
| JP | 2005-309921 | 11/2005 |
| JP | 2010-50795 | 3/2010 |

* cited by examiner

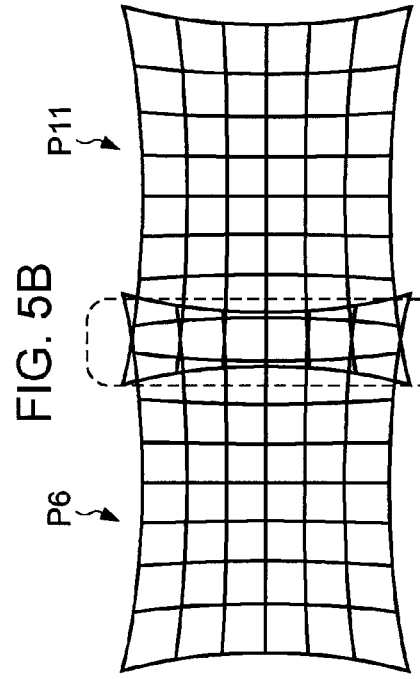
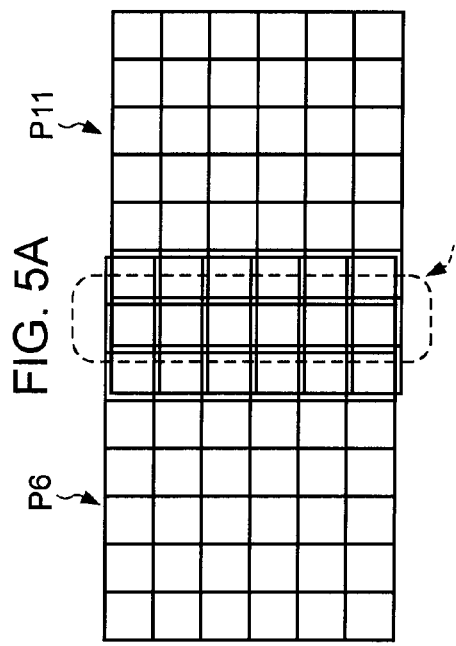
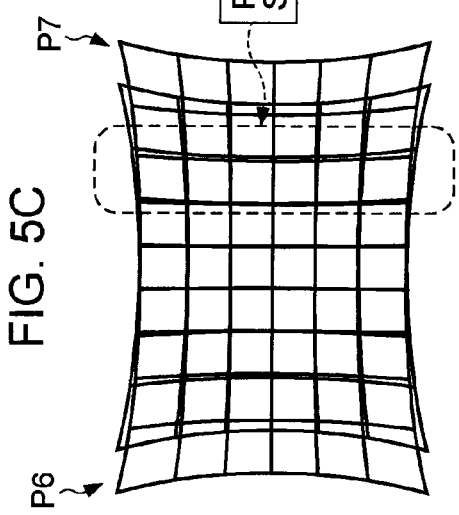

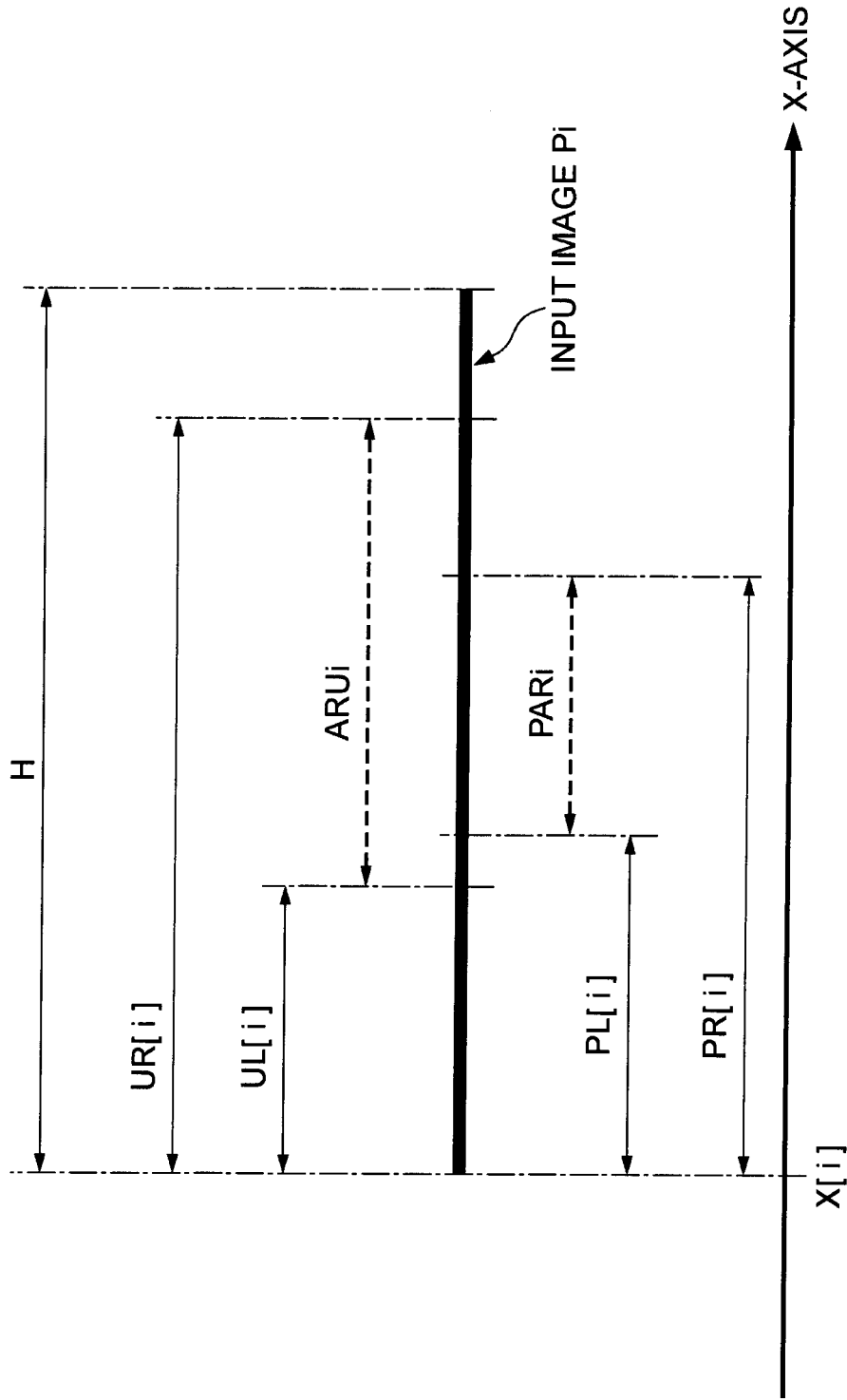

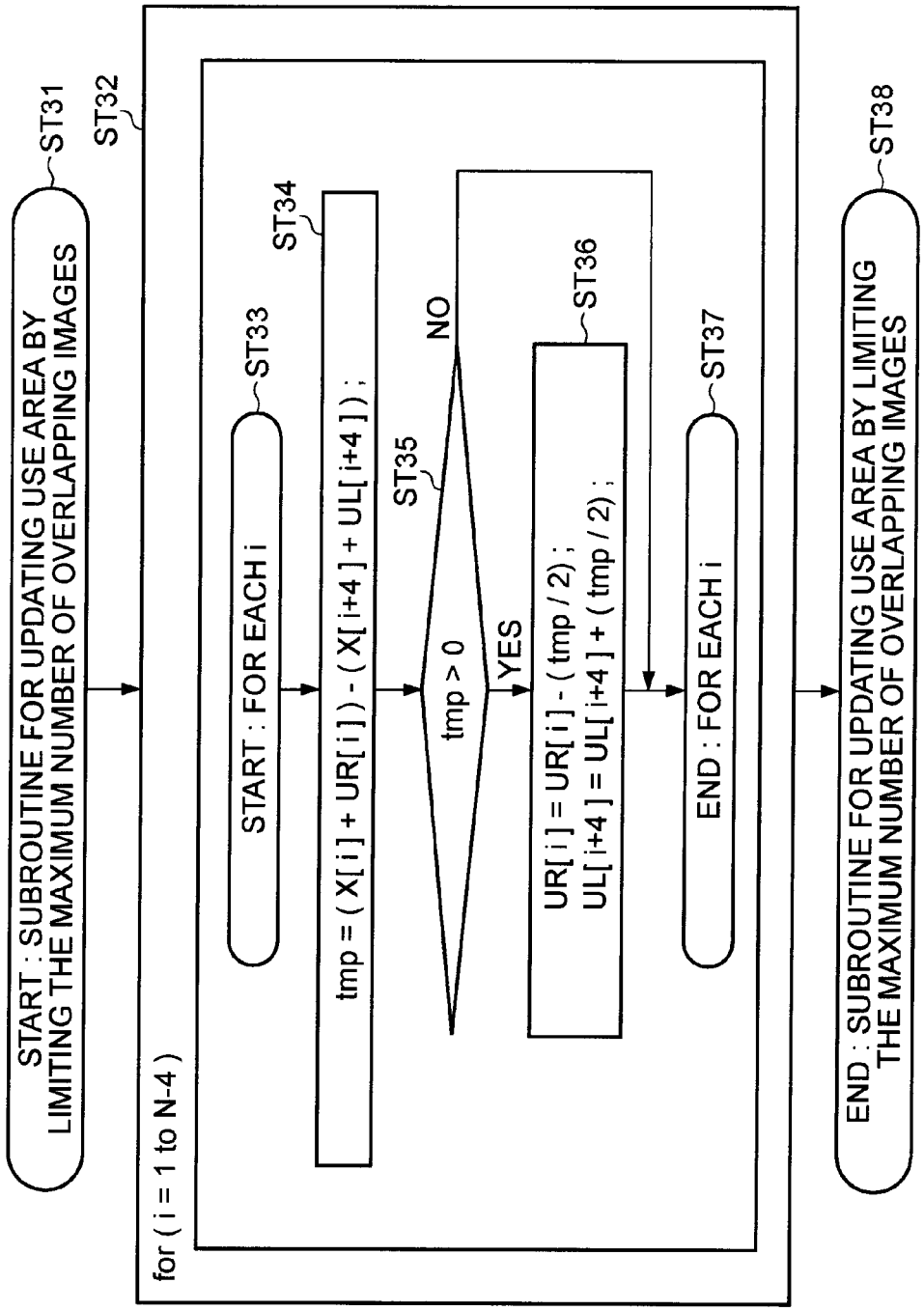

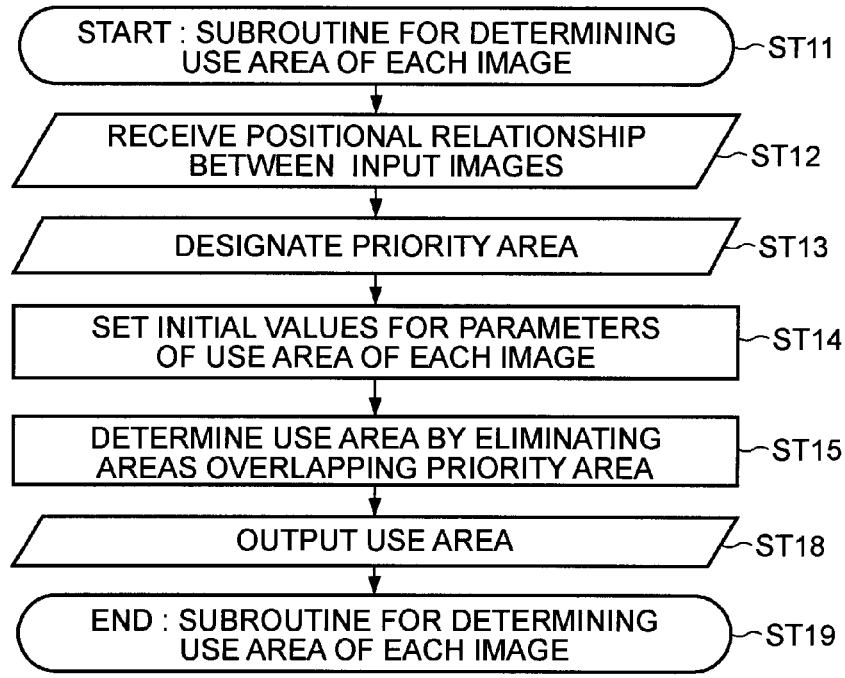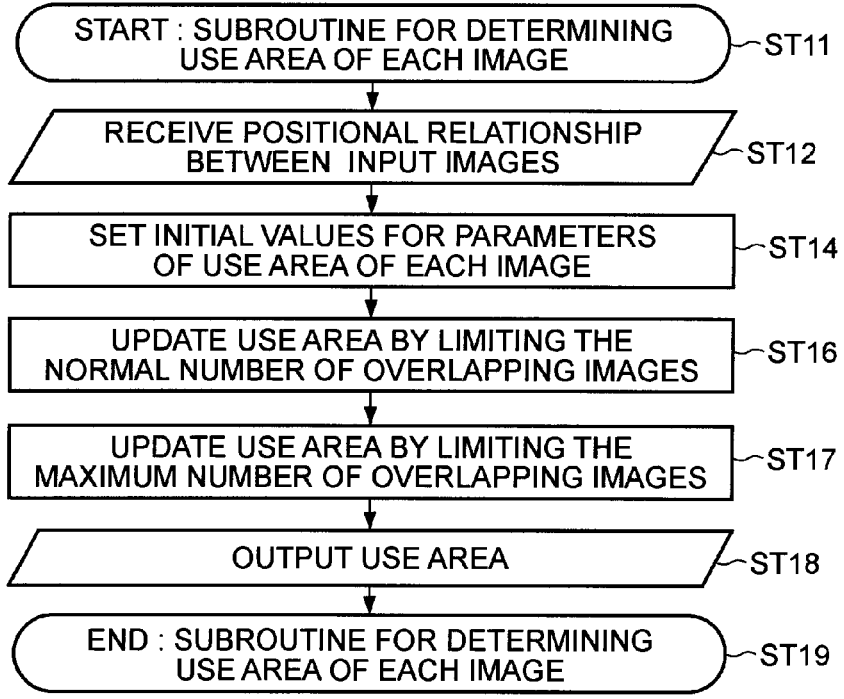

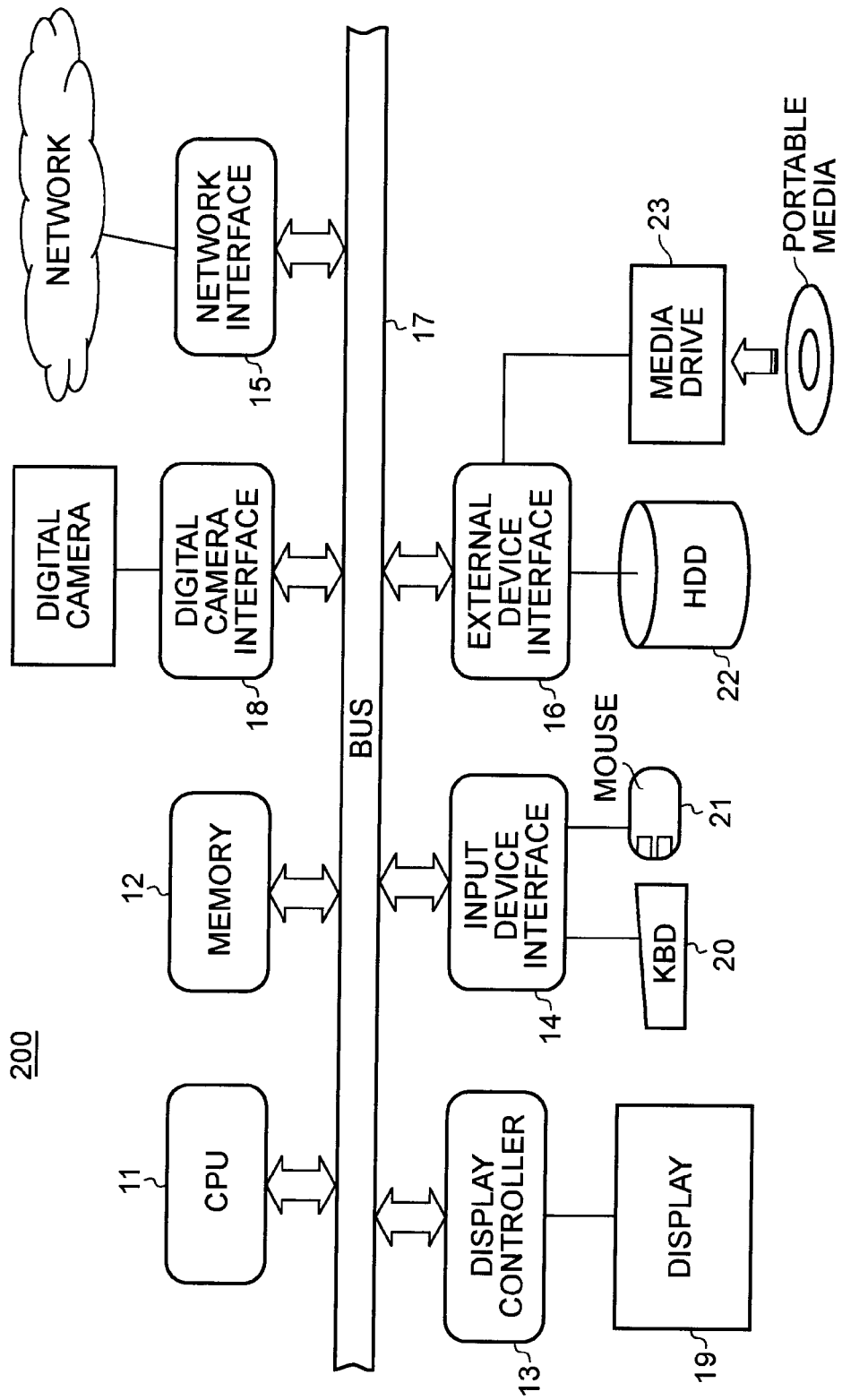

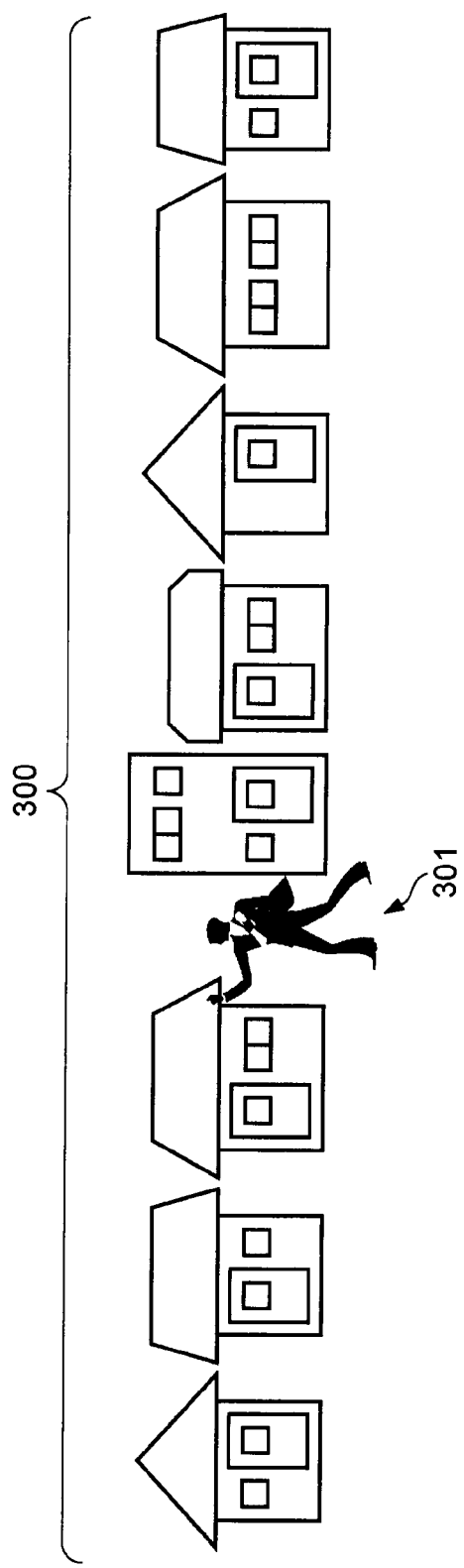

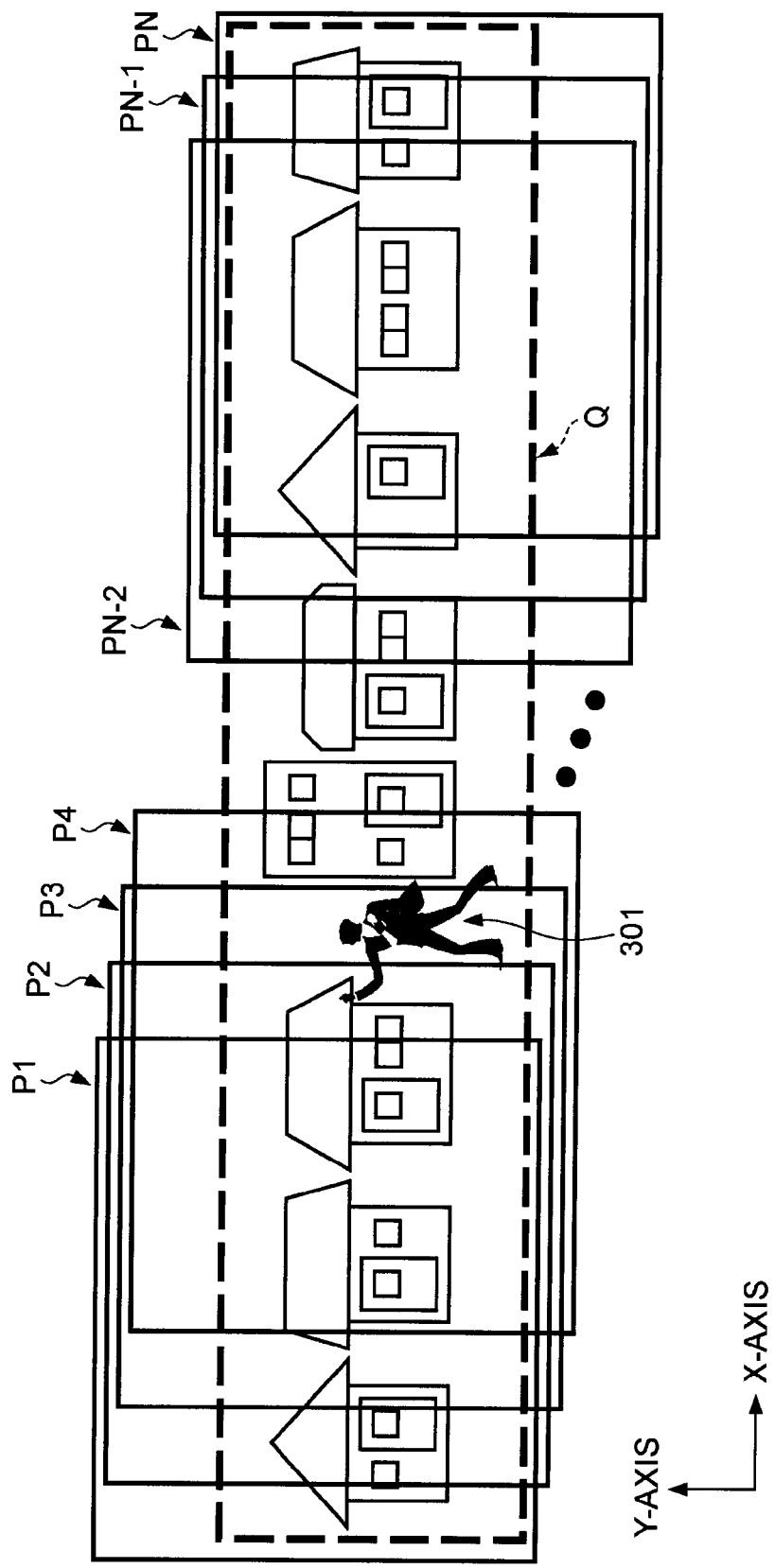

IMAGE PROCESSING APPARATUS, IMAGE PROCESSING METHOD AND PROGRAM

BACKGROUND OF THE INVENTION

1. Field of the Invention

The present invention relates to an image processing apparatus, an image processing method, and a program, and more particularly, to an image processing apparatus generating a panoramic image from a plurality of images.

2. Description of the Related Art

Panoramic photography in which a panoramic image is generated from a plurality of images captured by performing continuous shooting while panning a camera is widely performed (for example, see Japanese Unexamined Patent Application Publication No. 2000-299804). A detailed example will be described below.

A user captures a plurality of images of a scene illustrated in FIG. 16 while panning a camera; that is, sequentially shifting a shooting position in the horizontal direction. For example, the user mounts the camera on a tripod capable of rotating in the horizontal direction and performs shooting while manually panning the camera in the horizontal direction. The scene in FIG. 16 includes buildings 300 and a walking person 301. When continuous shooting is performed in such a situation while panning the camera, N images P1 to PN illustrated in FIG. 17 can be captured, for example.

In FIG. 17, images P5 to PN-3 are not illustrated. Moreover, since the camera is moved in only the horizontal direction, actually no positional shift occurs in the Y-axis direction between the images but the positional shift occurs in only the X-axis direction. However, in the figure, the rectangular areas of the images P1 to PN are intentionally drawn so as to be slightly vertically shifted from each other because otherwise they overlap, thus becoming difficult to view. From these N images, one panoramic image (which is surrounded by a dot line in FIG. 17) Q is generated.

A method of generating a panoramic image Q from N input images P1 to PN is as follows. First, the positional relationship between the N input images P1 to PN is calculated. That is to say, the amount of shift between the input images is calculated. Then, the input images are arranged at positions shifted by the shift amount. In a state where the N input images P1 to PN are arranged to be shifted from each other, a rectangular area included in the N input images P1 to PN is calculated. This rectangular area is the panoramic image Q which is to be output.

Attention is now directed to each position (X, Y) of the panoramic image Q, when there is only one input image at that position (X, Y), the pixel value at the position (X, Y) of that input image is used as the pixel value at the position (X, Y) of the panoramic image Q. When there is a plurality of input images at that position (X, Y), the average of the pixel values at the position (X, Y) of these input images is used as the pixel value at the position (X, Y) of the panoramic image Q.

SUMMARY OF THE INVENTION

As described above, when a panoramic image Q is generated from a plurality of images, it is necessary to determine an area of the panoramic image Q and determine the pixel value at each position within that area. In this case, there are pending problems to consider.

Pending Problem 1

In images captured by a camera, barrel-type distortion or pincushion-type distortion generally occurs due to lens distortion. When an image of a square lattice was captured, a user may expect an image as illustrated in FIG. 18A. However, in actual cases, an image including barrel-type distortion as illustrated in FIG. 18B or an image including pincushion-type distortion as illustrated in FIG. 18C is obtained.

When there is a plurality of input images at the position (X, Y) of the panoramic image Q, the pixel value at the position (X, Y) of each input image will have the same value if the input image was an ideal image without distortion. However, since the input images have distortion, the pixel value at the position (X,Y) of each input image will have a different value.

Therefore, when there is a plurality of input images at the position (X,Y) of the panoramic image Q as described above, and the average of the pixel values at the position (X, Y) of these input images is used as the pixel value at the position (X, Y) of the panoramic image Q, the pixel value will not be a proper value.

Pending Problem 2

As described above, when there is a plurality of input images at the position (X,Y) of the panoramic image Q, noise components can be reduced by using the average of the pixel values at the position (X,Y) of these input images as the pixel value at the position (X,Y) of the panoramic image Q. That is to say, when there is a plurality of input images at the position (X, Y) of the panoramic image Q, it may be advantageous to use as many input images as possible. However, when the pixel value of the panoramic image Q is determined using only one input image of the plurality of input images, the noise reduction effect may not be obtained.

Pending Problem 3

The respective input images are captured at different times. Thus, a moving object (e.g., a walking person 301 in FIGS. 16 and 17) will be projected to different figures and at different positions in each input image. Therefore, when the average pixel value of the plurality of input images is used as the pixel value of the panoramic image, an image blur may occur as if that range of areas is subjected to a multiple exposure. Therefore, when there is a plurality of input images at the position (X, Y) of the panoramic image Q as described above, and a moving object is projected at that position, it may be advantageous to use only one input image among them.

These three problems are pending. The following conclusions can be derived from these pending problems. That is, a conclusion derived from Pending Problem 1 is that it is advantageous to not use areas including different types of distortion in each input image. A conclusion derived from Pending Problem 2 is that it is advantageous to use as many images as possible because the peripheral portions of each input image are also useful. A conclusion derived from Pending Problem 3 is that when a moving object is projected in the input images, it is advantageous to use only one of the input images. These conclusions may sometimes result in a contradicting conclusion. That is to say, it is difficult to define a systematic method of generating a panoramic image from the input images, which systematically defines which area of each input image should be used for generating the panoramic image and which area should be eliminated.

It is therefore desirable to enable a panoramic image to be properly obtained from a plurality of images.

According to an embodiment of the present invention, there is provided an image processing apparatus including: a first image processor configured to receive, as a sequence of images, a plurality of images which is captured by sequentially shifting a shooting position in a predetermined direction, and set a first overlapping area overlapping a priority area which is to be used preferentially in the sequence of images, as a use-prohibited area with respect to images in the sequence of images other than the first image, the images including the first overlapping area; a second image processor configured to set a second overlapping area of a second or third image as a use-prohibited area, the second and third images having sequence orders being separated by a predetermined spacing in the sequence of images; and an image generator configured to generate an output image using areas of the plurality of images included in the sequence of images, excluding areas which are set as the use-prohibited areas by the first image processor and the second image processor.

In the embodiment of the present invention, the output image is generated from the sequence of images. The sequence of images includes a plurality of images which is captured by sequentially shifting a shooting position in a predetermined direction. For example, one panoramic image is generated from a plurality of images which is continuously shot while panning a camera.

The use-prohibited area of each image included in the sequence of images is set by the first image processor and the second image processor. In the first image processor, when a priority area which is used preferentially in the sequence of images is designated in a first image, a first overlapping area overlapping the priority area is set as the use-prohibited area with respect to images including the first overlapping area in the sequence of images excluding the first image. For example, the priority area is designated by a user operating a user operation unit.

In the second image processor, when the second and third images of which the sequence orders are separated by a predetermined spacing in the sequence of images have a second overlapping area, the second overlapping area of the second or third image is set as a use-prohibited area. For example, the predetermined spacing between the sequence orders is set by a user operating a user operation unit.

As described above, according to the embodiment of the present invention, when a priority area is designated in an image, areas of the other images overlapping the priority area are set as use-prohibited areas. Therefore, when an area in which a moving object is projected is designated by the user as a priority area, for example, only one image is used for that area when generating the panoramic image. Thus, it is possible to prevent occurrence of an image blur such as unintended multiple exposure.

Furthermore, as described above, according to the embodiment of the present invention, when two images of which the sequence orders are separated by a predetermined spacing have an overlapping area, one of the overlapping areas is set as a use-prohibited area. Therefore, the number of overlapping images of the input images to be used for generating the panoramic image is limited, whereby an image blur resulting from a positional shift of each input image due to the lens distortion can be reduced.

According to the embodiment of the present invention, when a priority area is designated in an image, areas of the other areas overlapping the priority area are set as the use-prohibited areas. When two images of which the sequence orders are separated by a predetermined spacing have an overlapping area, one of the overlapping areas is set as the use-prohibited area. Therefore, a panoramic image can be properly generated from a plurality of images.

BRIEF DESCRIPTION OF THE DRAWINGS

FIGS. 5A to 5C are diagrams illustrating a blur resulting from a positional shift of each image due to lens distortion (barrel-type distortion and pincushion-type distortion).

FIG. 6 is a diagram illustrating a process for determining a use area of each input image when generating a panoramic image.

FIG. 12 is a flowchart illustrating the detailed processing procedures for limiting the use area of each input image in order to the maximum number of overlapping images.

FIG. 13 is a flowchart illustrating another example of the detailed processing procedures for determining the use area (UL[i], UR[i]) of each input image.

FIG. 14 is a flowchart illustrating another example of the detailed processing procedures for determining the use area (UL[i], UR[i]) of each input image.

FIG. 15 is a block diagram illustrating an exemplary configuration of a computing device used for generating a panoramic image.

FIG. 16 is a diagram illustrating an example of a scene including buildings and a walking person.

FIG. 17 is a diagram illustrating examples of N images P1 to PN captured by performing continuous shooting while panning a camera.

DESCRIPTION OF THE PREFERRED EMBODIMENTS

Hereinafter, modes (hereinafter referred to as embodiments) for carrying out the present invention will be described. The description will be given in the following order:

1. Embodiment
2. Modification

1. Embodiment

Exemplary Configuration of Digital Camera

Figure 1:
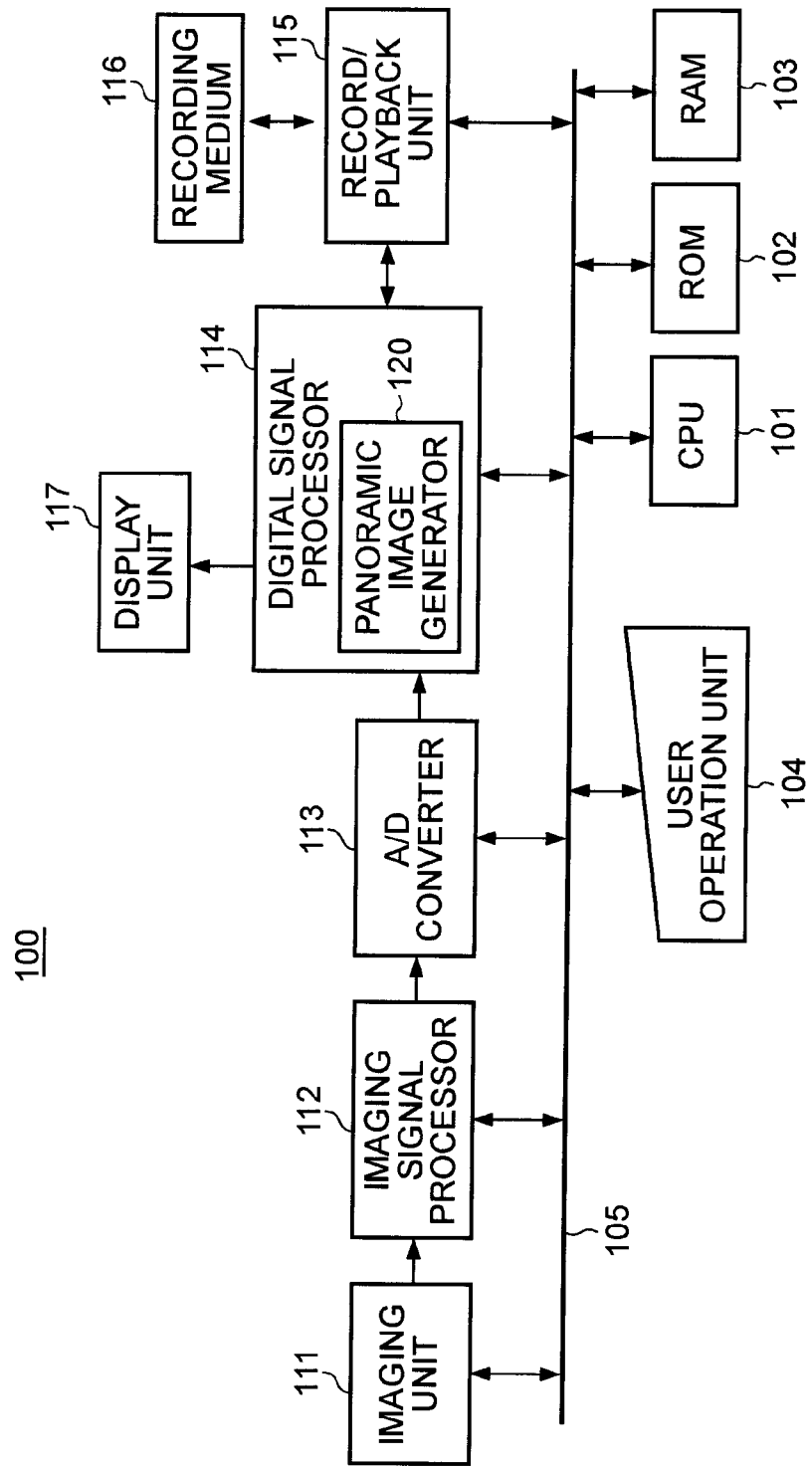
FIG. 1 is a block diagram illustrating an exemplary configuration of a digital camera according to an embodiment of the present invention.

FIG. 1 illustrates an exemplary configuration of a digital camera 100 according to the embodiment of the present invention. The digital camera 100 includes a CPU (central processing unit) 101, a ROM (read only memory) 102, a RAM (random access memory) 103, and a user operation unit 104. The digital camera 100 further includes a imaging unit 111, an image signal processor 112, an A/D (analog/digital) converter 113, a digital signal processor (DSP) 114, a record/playback unit 115, and a display unit 117.

The CPU 101 controls each part of the digital camera 100. The ROM 102 stores a control program of the CPU 101 and the like. The RAM 103 is used, for example, for temporarily storing data necessary for a control process of the CPU 101. The CPU 101 extends program or data read from the ROM 102 to the RAM 103 to run a program, thus controlling each part of the digital camera 100.

The user operation unit 104 constitutes a user interface and is connected to the CPU 101 via a bus 105. The user operation unit 104 includes keys, buttons, dials, and the like which are arranged on a non-illustrated casing surface of the digital camera 100. The CPU 101 analyzes information which is input from the user operation unit 104 via the bus 105 to perform control in response to a user's operation.

The imaging unit 111 images a subject to output captured image signals corresponding to the subject. The imaging unit 111 is configured by a C-MOS (complementary metal oxide semiconductor) imaging element or a CCD (charge coupled device) imaging element. The image signal processor 112 performs processing such as, for example, sample/hold and gain control with respect to the captured image signals (analog signal) which are output from the imaging unit 111.

The A/D converter 113 converts the captured image signals output from the image signal processor 112 from analog signals to digital signals. The digital signal processor 114 performs image signal processing on the captured image signals which are supplied from the A/D converter 113. The image processing referred herein includes a white balance process and a gamma correction process. Since these processes are performed in general-purpose digital cameras, details thereof will be omitted.

In this embodiment, the digital signal processor 114 includes a panoramic image generator 120 performing a panoramic image generation process. The panoramic image generation process is a process of generating a panoramic image from a plurality of images which is captured by performing continuous shooting while panning the camera, that is, a plurality of images which is captured while shifting sequentially a shooting position in a horizontal direction. Here, the plurality of images forms a sequence of images. The details of the panoramic image generation process will be described later.

The digital signal processor 114 transfers processed image data to the display unit 117 and the record/playback unit 115. The record/playback unit 115 writes/reads still image data corresponding to a user's shutter operation to/from a removable recording medium 116 which is mainly a flash memory. The display unit 117 is configured by a display panel such as LCD (liquid crystal display), which is mounted, for example, on a rear surface of the casing of the digital camera 100. The display unit 117 displays captured images, images read by the record/playback unit 115 from the recording medium 116, and various kinds of information useful to the user.

Next, the operation of the digital camera 100 illustrated in FIG. 1 will be described. In a recording mode, the digital camera 100 performs the following operations. The captured image signals obtained by the imaging process of the imaging unit 111 are supplied to the image signal processor 112, where processing such as, for example, sample/hold and gain control is performed. The captured image signals output from the image signal processor 112 are converted from analog signals to digital signals by the A/D converter 113 and are then supplied to the digital signal processor 114. In the digital signal processor 114, the captured image signals supplied from the A/D converter 113 are subjected to image signal processing such as, for example, a white balance process and a gamma correction process.

The image data obtained by the processing of the digital signal processor 114 are transferred to the display unit 117. In this way, the captured images are displayed on the display unit 117, and the camera enters a monitoring state. In this monitoring state, when the user performs a shutter operation with the user operation unit 104, the CPU 101 controls the digital signal processor 114 and the record/playback unit 115 so that still image data are written to the recording medium 116 in response to the shutter operation. In this case, for example, when the user performs the shutter operation while panning the camera, that is, shifting sequentially the shooting position in the horizontal direction, still image data of a plurality of images to be used for generating a panoramic image are written to the recording medium 116.

In a playback mode, the digital camera 100 performs the following operations. In the record/playback unit 115, still image data selected by the user's operation on the user operation unit 104 are read from the recording medium 116. The still image data are supplied from the record/playback unit 115 to the display unit 117 via the digital signal processor 114. In this way, playback images are displayed on the display unit 117.

Panoramic Image Generation Process

Figure 2:
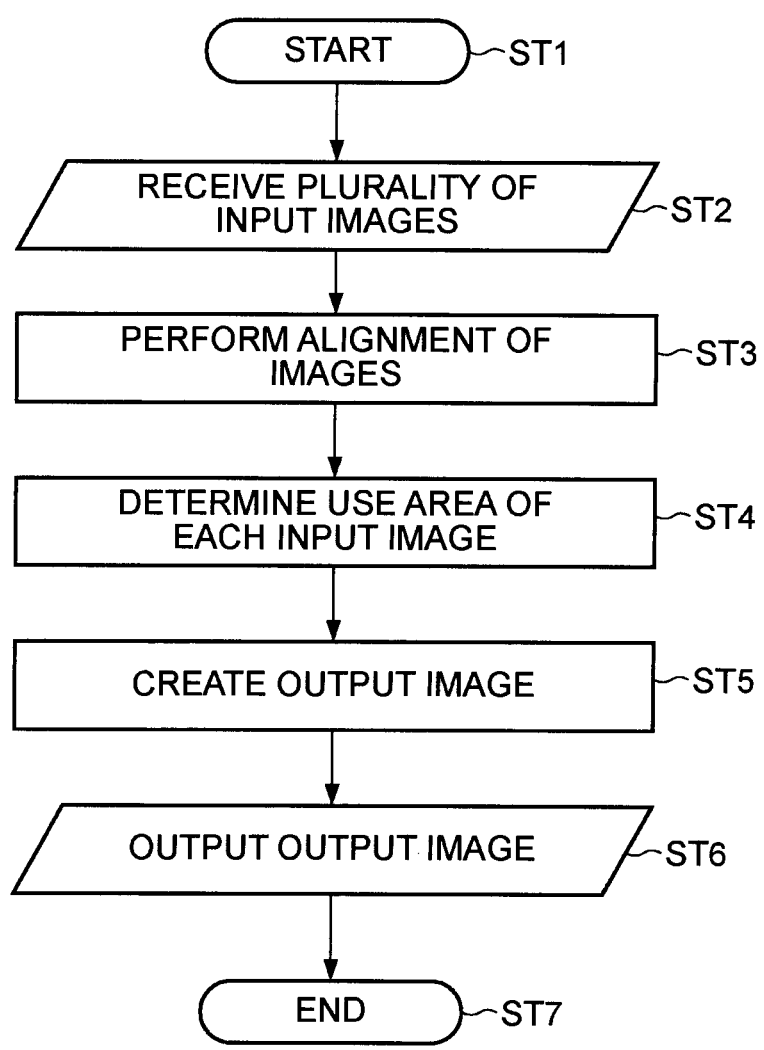
FIG. 2 is a flowchart illustrating the processing procedures of a panoramic image generation process in a panoramic image generator.

Next, the panoramic image generation process will be described. The panoramic image is generated by the panoramic image generator 120 within the digital signal processor 114 under the control of the CPU 101. The flowchart of FIG. 2 illustrates the processing procedures of the panoramic image generation process in the panoramic image generator 120.

When the user operates the user operation unit 104 to issue a panoramic image generation command, the panoramic image generator 120 starts the panoramic image generation process at step ST1. Upon issuing the panoramic image generation command, the user designates a plurality of images (sequence of images) to be used for generating a panoramic image, for example, by selecting still image data files which are recorded in the recording medium 116.

Subsequently, at step ST2, the panoramic image generator 120 receives the plurality of images (N images P1 to PN) to be used for generating the panoramic image. In this case, the panoramic image generator 120 reads still image data of the plurality of images from the recording medium 116 via the record/playback unit 115 and temporarily stores the still image data in a non-illustrated memory which is configured by a semiconductor memory such as SDRAM.

Subsequently, at step ST3, the panoramic image generator 120 performs alignment of the plurality of images. In this case, the panoramic image generator 120 performs the alignment by calculating the correlation between the images. A block-matching method which is well known in the related art may be used as a method of calculating the correlation between images; however, a detailed description thereof will be omitted. By the alignment of the plurality of images, the X coordinate $X[i]$ of the left edge of each input image Pi (i=1 to N) is determined (see FIGS. 3 and 4).

Subsequently, at step ST4, the panoramic image generator 120 determines a use area of each input image. Here, a method of determining the use area of each input image will be described with reference to FIGS. 3 to 5.

Figure 3:
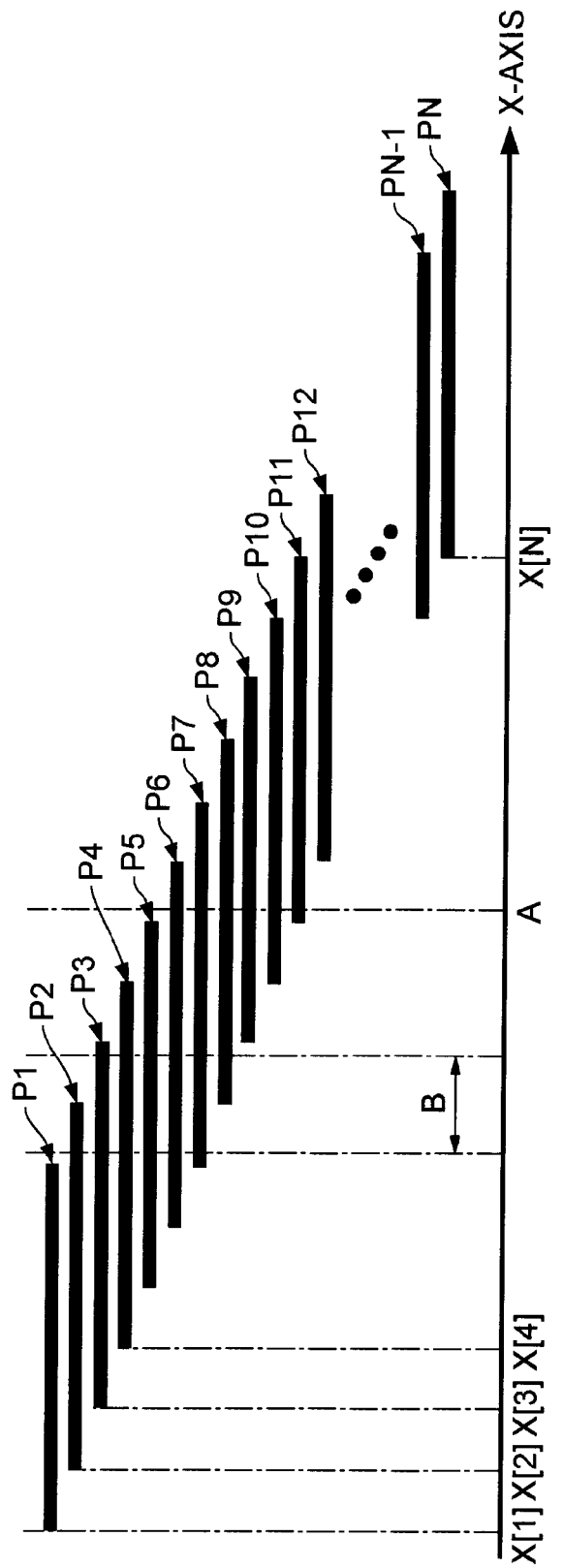
FIG. 3 is a diagram illustrating a process for determining a use area of each input image when generating a panoramic image.
Figure 4:
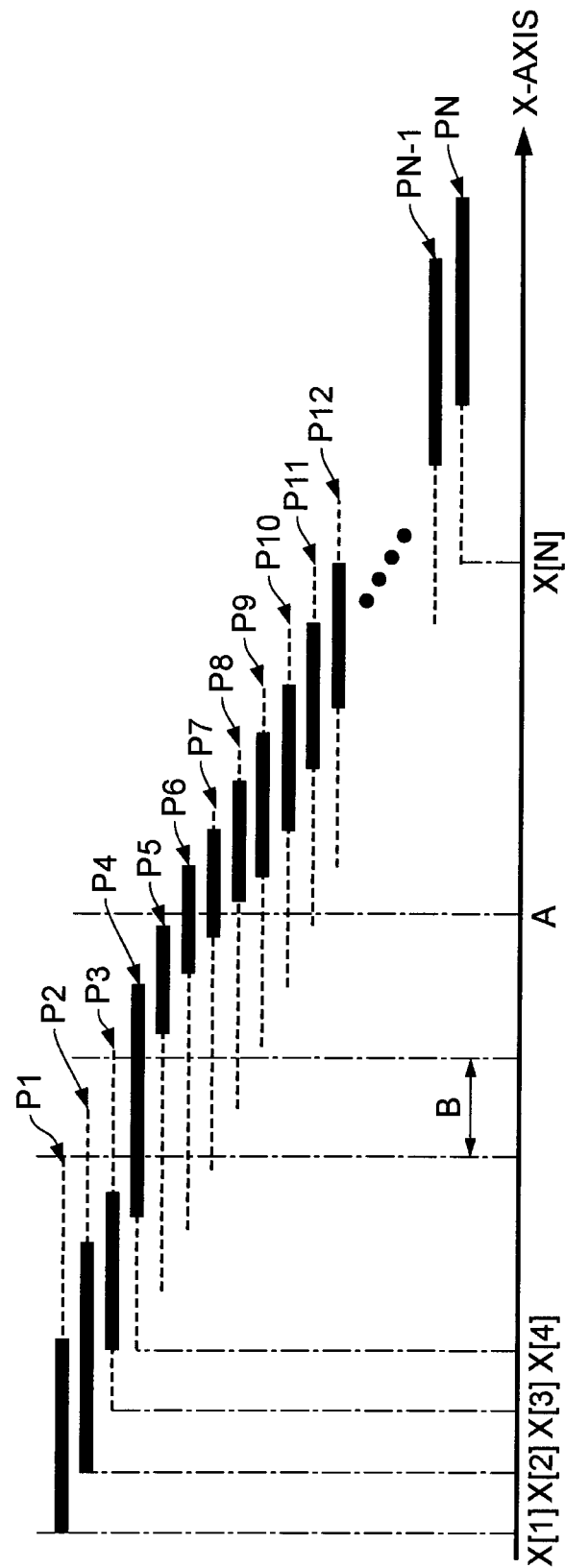
FIG. 4 is a diagram illustrating a process for determining a use area of each input image when generating a panoramic image.

Since the N input images P1 to PN are images which are captured by performing continuous shooting while panning the camera in the horizontal direction, no positional shift occurs in the Y-axis direction. Therefore, it is only necessary to consider a positional shift in the X-axis direction. FIGS. 3 and 4 are diagrams illustrating the positional shift in the X-axis direction. In FIG. 3, P1 to PN are the above-described input images, in which P13 to PN-2 are not illustrated. Since the input images P1 to PN are captured while panning the camera, they are positioned at positions whiled being shifted in the positive direction of the X-axis. The X coordinate of the left edge of each input image Pi (i=1 to N) is denoted by X[i].

Attention is now directed to the position "A" in FIG. 3. At this position, there are six input images P6 to P11. Therefore, according to the method of the related art, the pixel value at the position "A" of the panoramic image Q will be the average of the pixel values at the position "A" of the input images P6 to P11. The position "A" in the input image P6 corresponds to the right edge of the image, and the position "A" in the input image P11 corresponds to the left edge of the image.

As described earlier in the related art section, if there is no distortion, there will be absolutely no positional shift between the input image P6 and the input image P11 as illustrated in FIG. 5A, and thus, there is no problem. However, if there is a pincushion-type distortion, for example, the positional shift between the input image P6 and the input image P11 will increase as illustrated in FIG. 5B. Thus, the panoramic image Q will not become a proper image. The same can be said for a barrel-type distortion.

Attention is now directed to the range "B" in FIG. 3. It will be assumed that a moving object (for example, the walking person 301 in FIGS. 16 and 17) is projected in this range. In this range, there are seven input images P2 to P8. Therefore, according to the method of the related art, the pixel value at each position in the range "B" of the panoramic image Q will be the average of the pixel values at such positions of the input images P2 to P8. Since the input images P2 to P8 are sequentially captured, they are not captured at the same time. Thus, a moving object will be projected to different figures and at different positions in the input images P2 to P8. Therefore, when the average pixel value of the plurality of input images is used as the pixel value of the panoramic image, an image blur may occur as if that range of areas is subjected to a multiple exposure.

Here, it will be assumed that by using a certain method, it is possible to use only areas depicted by solid lines while using areas depicted by dot lines as non-use areas among the input images P1 to PN, as illustrated in FIG. 4. That is to say, a case will be considered in which the panoramic image Q is generated using only the areas depicted by solid lines among the input images P1 to PN.

In this case, at the position "A", there are only two input images P6 and P7 differently from the case of FIG. 3. The pixel value at the position "A" of the panoramic image Q will be the average of the pixel values at the position "A" of the input image P6 and the input image P7. The position "A" in the input image P6 corresponds to the right edge of the image, and the position "A" in the input image P7 also corresponds to the right edge of the image. Even when the two images have a pincushion-type distortion, the input image P6 and the input image P7 will be in such a relationship as illustrated in FIG. 5C.

That is to say, the position "A" (the right edge of the image) in the input image P6 and the position "A" (approximately the right edge of the image) in the input image P7 have the same distortion and are connected in a state where they are subject to a pincushion-type distortion of similar degree, and the positional shift is negligibly small. Therefore, the panoramic image Q will become a proper image. The same can be said for a barrel-type distortion.

Furthermore, in the range "B", there is only one input image P4 differently from the case of FIG. 3. Therefore, the pixel value at each position in the range "B" of the panoramic image Q will be the same as the corresponding pixel value of the input image P4. For this reason, the image blur problem such as unintended multiple exposure will not occur which otherwise occurs when the average pixel value of the plurality of input images is used as the pixel value of the panoramic image.

As understood from the above description, when generating panoramic images, it is an important issue to enable each image area to be automatically partitioned into the dotted-line area (non-use area) and the solid-line area (use area) as illustrated in FIG. 4.

At step ST4, the panoramic image generator 120 sets the non-use area (the dotted-line area in FIG. 4) of each of the input images P1 to PN by considering the three Pending Problems mentioned in the related art section, thus determining the use area (the solid-line area in FIG. 4) of each input image. The details of this determining process will be provided later.

Referring now to FIG. 2, subsequently, at step ST5, the panoramic image generator 120 generates the panoramic image Q which is an output image. Specifically, a rectangular area included in the N input images P1 to PN (in which the use area is limited at step ST4) is used as the area corresponding to the panoramic image Q. Attention is now directed to each position (X, Y) of the panoramic image Q. When there is only one input image (in which the use area is limited at step ST4) at that position (X, Y), the pixel value of that input image is used as the pixel value at the position (X, Y) of the panoramic image Q. When there is a plurality of input images (in which the use area is limited at step ST4) at that position (X, Y), the average of the pixel values of these input images is used as the pixel value at the position (X, Y) of the panoramic image Q.

Subsequently, at step ST6, the panoramic image generator 120 outputs the panoramic image Q, of which the pixel value is determined at step ST5, as an output image. In this case, the panoramic image generator 120 writes the still image data of the panoramic image Q to the recording medium 116 with the aid of the record/playback unit 115. Furthermore, in this case, the still image data of the panoramic image Q are supplied to the display unit 117, and the generated panoramic image Q is displayed on the display unit 117. In this way, the user is able to monitor the generated panoramic image Q.

Subsequent to the processing of step ST6, the panoramic image generator 120 terminates a series of processing for generating the panoramic image Q at step ST7.

Use Area Determining Process

Next, the details of the above-described use area determining process (the process of step ST4 in FIG. 2) in the panoramic image generator 120 will be described. Specifically, this determining process is a process of determining the use area ARUi (which extends from UL[i] to UR[i] with X[i] as a reference position) of each input image Pi (i=1 to N) as illustrated in FIG. 6. In FIG. 6, H is a width of the input image Pi, and PL[i] and PR[i] are values designated by the user, which will be described later.

Figure 7:
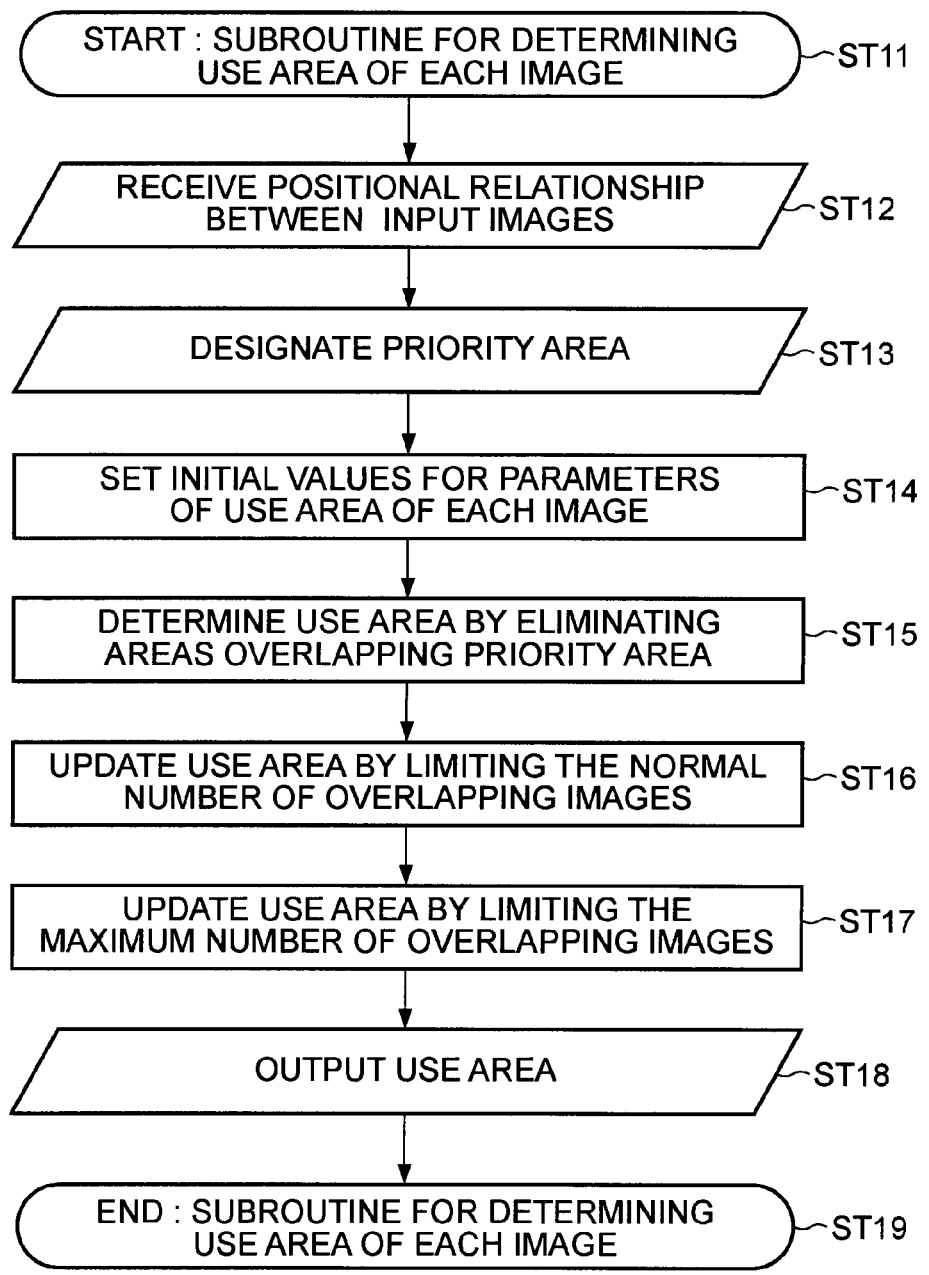
FIG. 7 is a flowchart illustrating an example of the detailed processing procedures for determining the use area (UL[i], UR[i]) of each input image.

Specifically, the process of step ST4 in FIG. 2, namely the process of determining the use area (specifically, UL[i] and UR[i]) is realized by the processing procedures illustrated in the flowchart of FIG. 7.

At step ST11, the panoramic image generator 120 starts the processing, and then proceeds to step ST12. At step ST12, the panoramic image generator 120 receives the positional relationship between the N input images P1 to PN, specifically the X coordinates X[1] to X[N] of the left edges of the input images P1 to PN. The X coordinates X[1] to X[N] of the left edges of the input images P1 to PN are determined at the same time as when the position of each image is determined by the alignment of the plurality of images (step ST3 of FIG. 2).

Next, the panoramic image generator 120 proceeds to step ST13. At step ST13, the user is allowed to designate a priority·area PARi. In this case, the user operates the user operation unit 104 (see FIG. 1) to designate PL[i] and PR[i] (see FIG. 6), as necessary, with respect to the input image Pi, thus designating the priority area PARi. Here, "as necessary" is used to mean that they may be not designated for a certain i. That is to say, PL[i] and PR[i] may be designated for all i (i=1 to N), and any of PL[i] and PR[i] may not be designated for all i (i=i to N).

For example, the user designates PL[i] and PR[i] so that the priority area PARi includes a projection area of a moving object while monitoring the input image Pi. In this case, a relation of 0≤PL[i]<PR[i]≤H is satisfied. For example, when images are captured in the state illustrated in FIGS. 16 and 17, the user may designate an area (the range B in FIG. 3) including the projection area of the walking person 301 with respect to the input image P4. More specifically, the position of the left edge of the area including the projection area of the walking person 301 is designated as PL[4], and the position of the right edge of the area including the projection area of the walking person 301 is designated as PR[4].

Next, the panoramic image generator 120 proceeds to step ST14. At step ST14, the panoramic image generator 120 initializes the use area of each input image Pi (i=1 to N). That is to say, for all i (i=1 to N), UL[i]=0 and UR[i]=H. Here, H is the width of each input image as described above. The pseudo code for this process is as follows.

```
// pseudo code: subroutine for setting the initial values
for parameters of the use area of each image
for(i=1 to N) {
    UL[i]=0;
    UR[i]=H;
}
// pseudo code end
```

Next, the panoramic image generator 120 proceeds to step ST15. At step ST15, the panoramic image generator 120 sets an area (overlapping area) of another input image overlapping the priority area designated at step ST13 as a non-use area (elimination area). That is to say, the panoramic image generator 120 updates the UL[i] and UR[i] of each input image Pi so as to eliminate the overlapping area.

Figure 8:
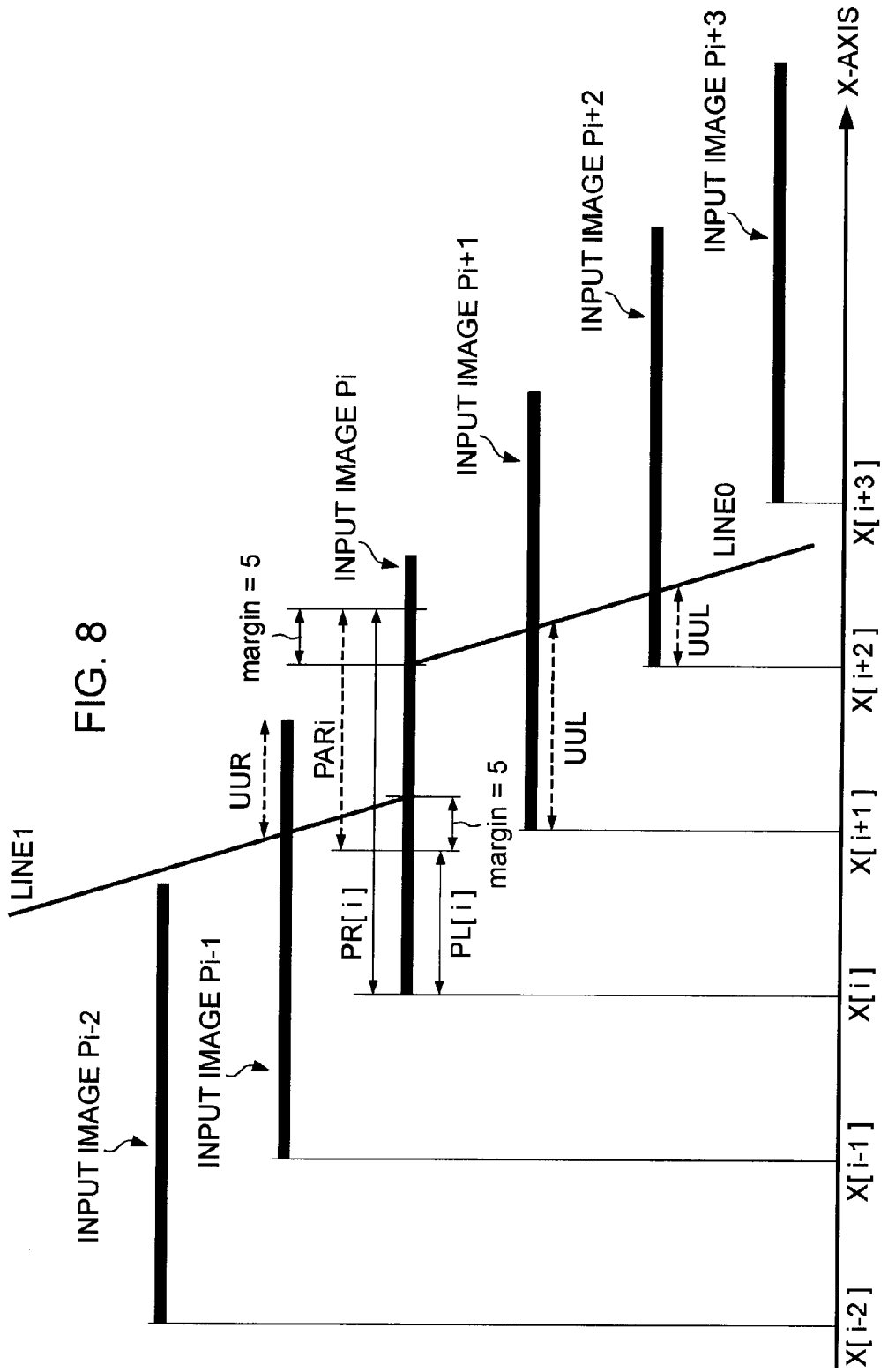
FIG. 8 is a diagram illustrating the detailed processing procedures for determining an area (overlapping area) of another input image overlapping a priority area as a non-use area (elimination area).

This is a countermeasure to solve Pending Problem 3 mentioned in the related art section. The detailed processing procedures will be described with reference to FIG. 8. In FIG. 8, six input images Pi-2 to Pi+3 which are part of the input images are illustrated. Moreover, in step ST13, it is assumed that a priority area PARi (specifically, PL[i] and PR[i]) is designated in the input image Pi.

A straight line LINE0 with a downward slope of one pixel per image is drawn from a position which is shifted leftward from the right edge of the priority area PARi of the input image Pi by a predetermined margin (e.g., 5 pixels). Among portions of the input images Pi+1 to PN, a portion that is located to the left of the straight line LINE0 is used as a non-use area (elimination area) UUL, and the remaining portion is used as a use area. Similarly, a straight line LINE1 with a downward slope of one pixel per image is drawn from a position which is shifted rightward from the left edge of the priority area PARi of the input image Pi by a predetermined margin (e.g., 5 pixels). Among portions of the input images P1 to Pi-1, a portion that is located to the right of the straight line LINE1 is used as a non-use area (elimination area) UUR, and the remaining portion is used as a use area.

By doing so, areas (overlapping areas) of other input images which are located at the same position as the priority area PARi of the input image Pi are eliminated, and in this priority area, the panoramic image Q will be formed of only the input image Pi. The pseudo code for this process is as follows.

```
// pseudo code: subroutine for eliminating portions
overlapping the priority area
margin=5;
for(i=1 to N – 1) {// Note: incremental loop
    if(priority area is designated in InputImage[i]) {
        leftLimit=X[i]+PR[i]– margin;
        for(j=i+1 to N) {// Note: incremental loop
            ++leftLimit;
            tmpLowerLimit=leftLimit – X[j];
            if(UL[j]<tmpLowerLimit) {UL[j]=tmpLowerLimit; }
        }
    }
}
for(i=N to 2) {// Note: decrementalloop
    if(priority area is designated in InputImage[i]) {
        if(UL[i]<=PR[i]) {
            // Note: if UL[i] is bigger than PR[i], then
ignore the priority area of InputImage[i].
            if(UL[i]<=PL [i]) {
                rightLimit=X[i]+PL[i]+margin;
            } else {
                rightLimit=X[i]+UL[i]+margin;
            }
            for(j=i – 1 to 1) {// Note: decremental loop
                --rightLimit;
                tmpHigherLimit=rightLimit – X[j];
                if(tmpHigherLimit<UR[i])
        {UR[i]=tmpHigherLimit; }
            }
        }
    }
}
// pseudo code end
```

However, there may be a case where a part or an entirety of a priority area which is designated for an input image is eliminated by the processing of the first for loop on an input image in which a newer number is given and a priority area is designated. In that case, as described in the processing of the second for loop, only portions which are not eliminated are used as the priority areas, thus eliminating possible contradiction.

Returning now to FIG. 7, subsequently, the panoramic image generator 120 proceeds to step ST16. At step ST16, the panoramic image generator 120 limits the use area of each input image in order to limit the number of overlapping images in a normal case. Specifically, the panoramic image generator 120 updates the UL[i] and UR[i] so that three images overlap each other at edges of the input images, and two images overlap each other at portions other than the edges.

Figure 9:
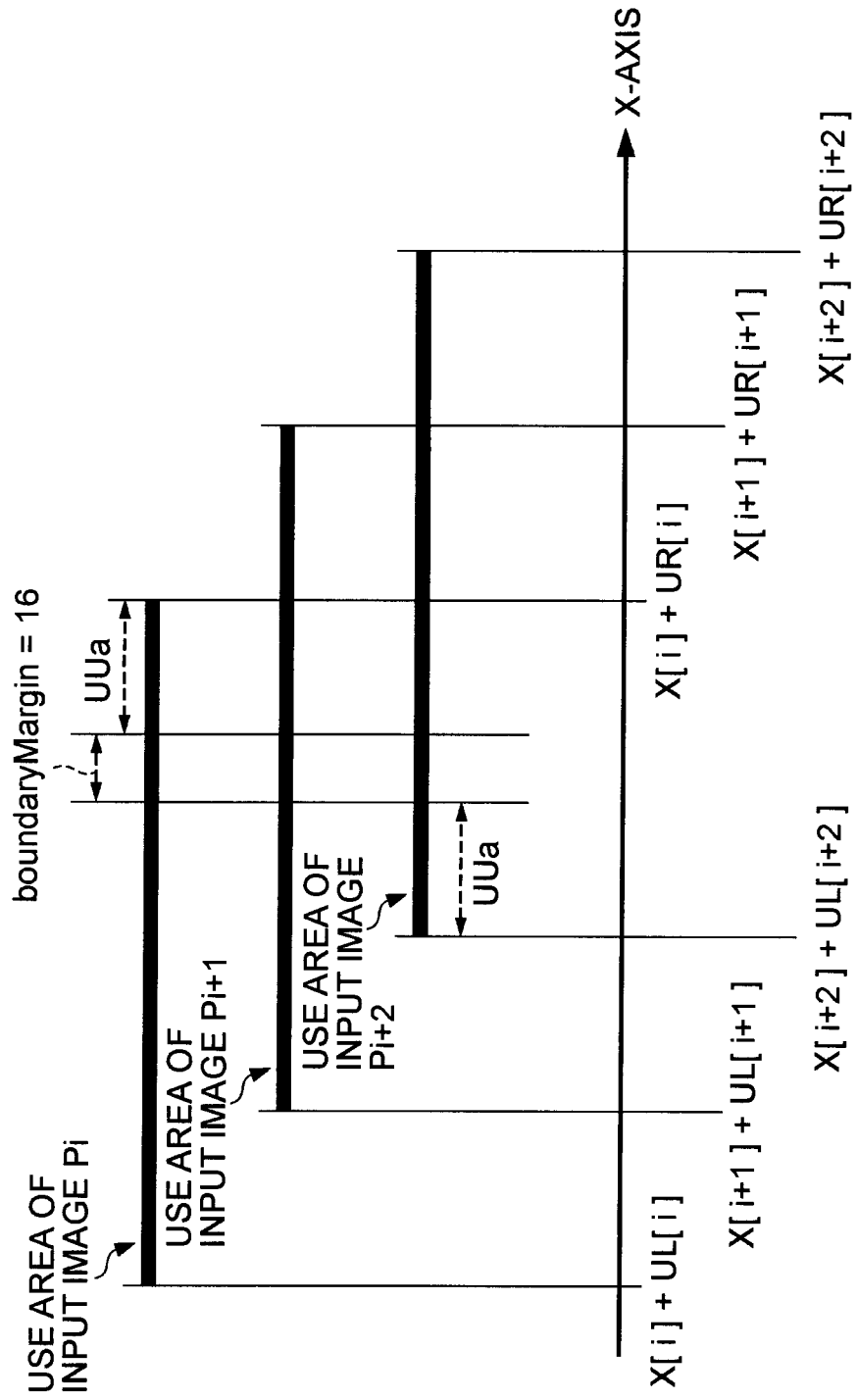
FIG. 9 is a diagram illustrating the detailed processing procedures for limiting the use area of each input image in order to limit the normal number of overlapping images.

This is a countermeasure to solve Pending Problems 1 and 2 mentioned in the related art section. The detailed processing procedures will be described with reference to FIG. 9. In FIG. 9, the use areas of three input images Pi to Pi+2 which are parts of the input images are illustrated. The use area of each input image is the remaining area excluding the non-use area (elimination area) which is determined by the processing of step ST15. That is to say, the use area as used therein refers to an area between UL[i] and UR[i], an area between UL[i+1] and UR[i+1], and an area between UL[i+2] and UR[i+2], which are designated by the processing of step ST15.

The panoramic image generator 120 determines whether or not an overlap of equal to or larger than a predetermined boundary margin, boundaryMargin, (e.g., 16 pixels) is present between the use area of the input image Pi and the use area of the input image Pi+2. When an overlap of equal to or larger than boundaryMargin is present, the panoramic image generator 120 sets a portion of the use area of each of the input images Pi and Pi+2 as a non-use area (elimination area) UUa as illustrated in FIG. 9 so that the overlap becomes identical to boundaryMargin.

By doing so, three images will overlap each other at the edges of the input images after the non-use area is eliminated, and two images will overlap each other at the edges of the input images, whereby the panoramic image Q can be generated with an appropriate number of overlapping images.

Figure 10:
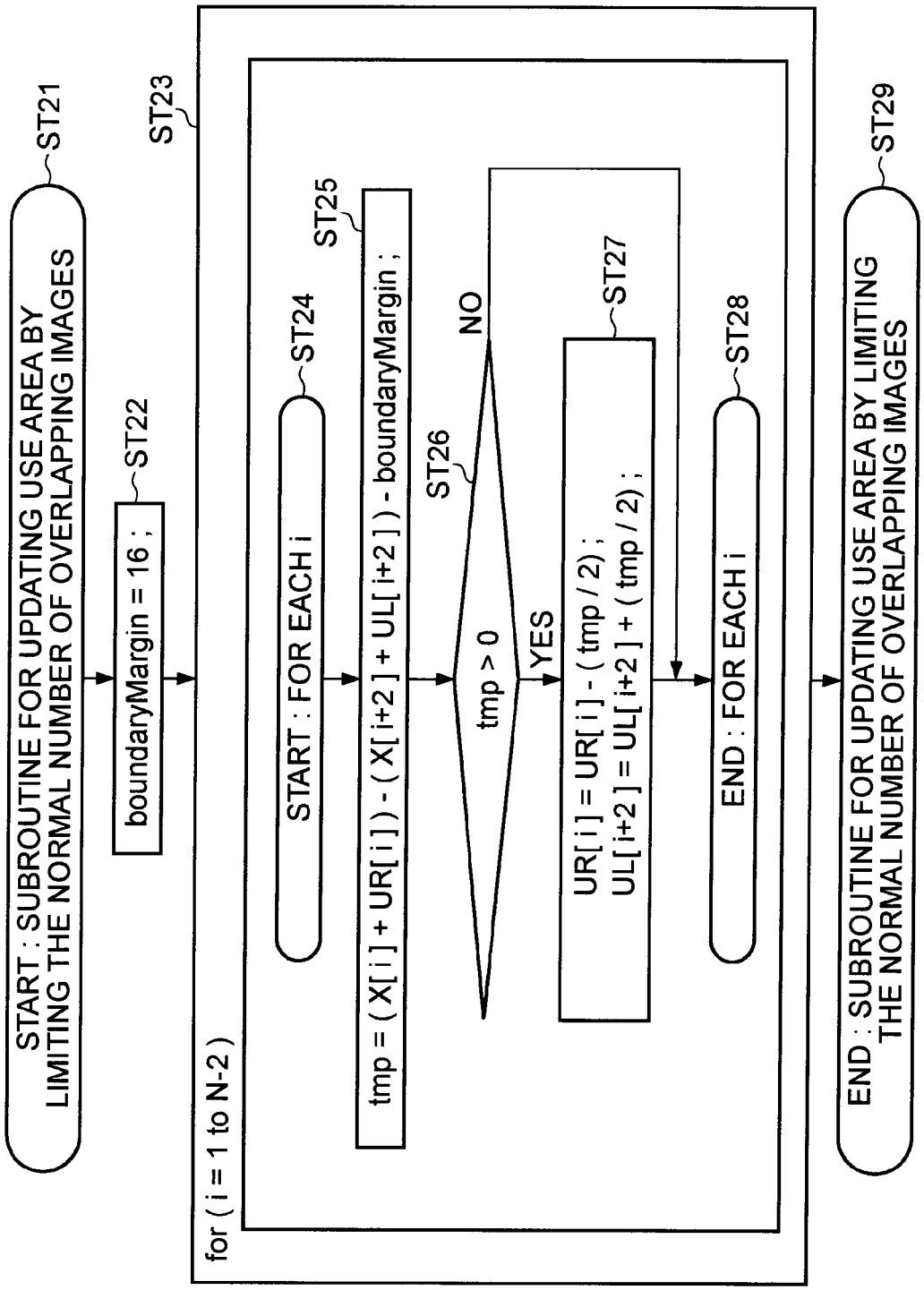
FIG. 10 is a flowchart illustrating the detailed processing procedures for limiting the use area of each input image in order to limit the normal number of overlapping images.

The flowchart of FIG. 10 illustrates the procedures for the processing of step ST16, specifically the processing procedures for limiting the use area of the input image in order to limit the number of overlapping images in the normal case.

At step ST21, the panoramic image generator 120 starts a use area limiting process, and then proceeds to step ST22. At step ST22, the panoramic image generator 120 sets the boundary margin to "16", for example.

Subsequent to the processing of step ST22, the panoramic image generator 120 proceeds to repetitive processing for each i (i=1 to N−2) at step ST23. In this repetitive processing, the panoramic image generator 120 starts the processing at step ST24, and then proceeds to step ST25. At step ST25, the panoramic image generator 120 calculates tmp=(X[i]+UR[i])−(X[i+2]+UL[i+2])−boundaryMargin.

Subsequently, at step ST26, the panoramic image generator 120 determines whether the tmp has a positive value. When the tmp has a positive value, it means that an overlap of equal to or larger than boundaryMargin is present between the use area of the input image Pi and the use area of the input image Pi+2. Therefore, when the tmp has a negative value, the panoramic image generator 120 immediately terminates the processing at step ST28 and proceeds to perform processing for the next i.

When the tmp has a positive value, the panoramic image generator 120 updates the UR[i] and UL[i+2] to UR[i]=UR[i]−(tmp/2) and UL[i+2]=UL[i+2]+(tmp/2), respectively, at step ST27. Then, the panoramic image generator 120 terminates the processing at step ST28 and proceeds to perform processing for the next i.

When the repetitive processing for each i (i=1 to N−2) at step ST23 is completed, the panoramic image generator 120 terminates the use area limiting process at step ST29.

In the above description, it has been described for the case where the number of overlapping images is limited to three at the edges and two at portions other than the edges. However, it can be generalized so that the number of overlapping images is limited to S (S is an integer of 2 or more) at the edges and S-1 at portions other than the edges. The user may set the value of S in advance by operating the user operation unit 104 (see FIG. 1). The above description is an example of a case where S=3. For example, when lens distortion is larger, it is possible to reduce an image blur resulting from a positional shift of each input image due to the lens distortion by decreasing the value of S. Furthermore, when many noise components are included, it is possible to obtain an image with less noise by increasing the value of S.

Returning now to FIG. 7, subsequently, the panoramic image generator 120 proceeds to step ST17. Although the number of overlapping images is limited to some degree by the processing of step ST16, the total number of overlapping images may increase eventually. At step ST17, the panoramic image generator 120 limits the use area of each input image in order to limit the maximum number of overlapping images. That is to say, the panoramic image generator 120 updates the UL[i] and UR[i] so that at any position of the input images, there will be only four images, at most, overlapping each other.

Figure 11:
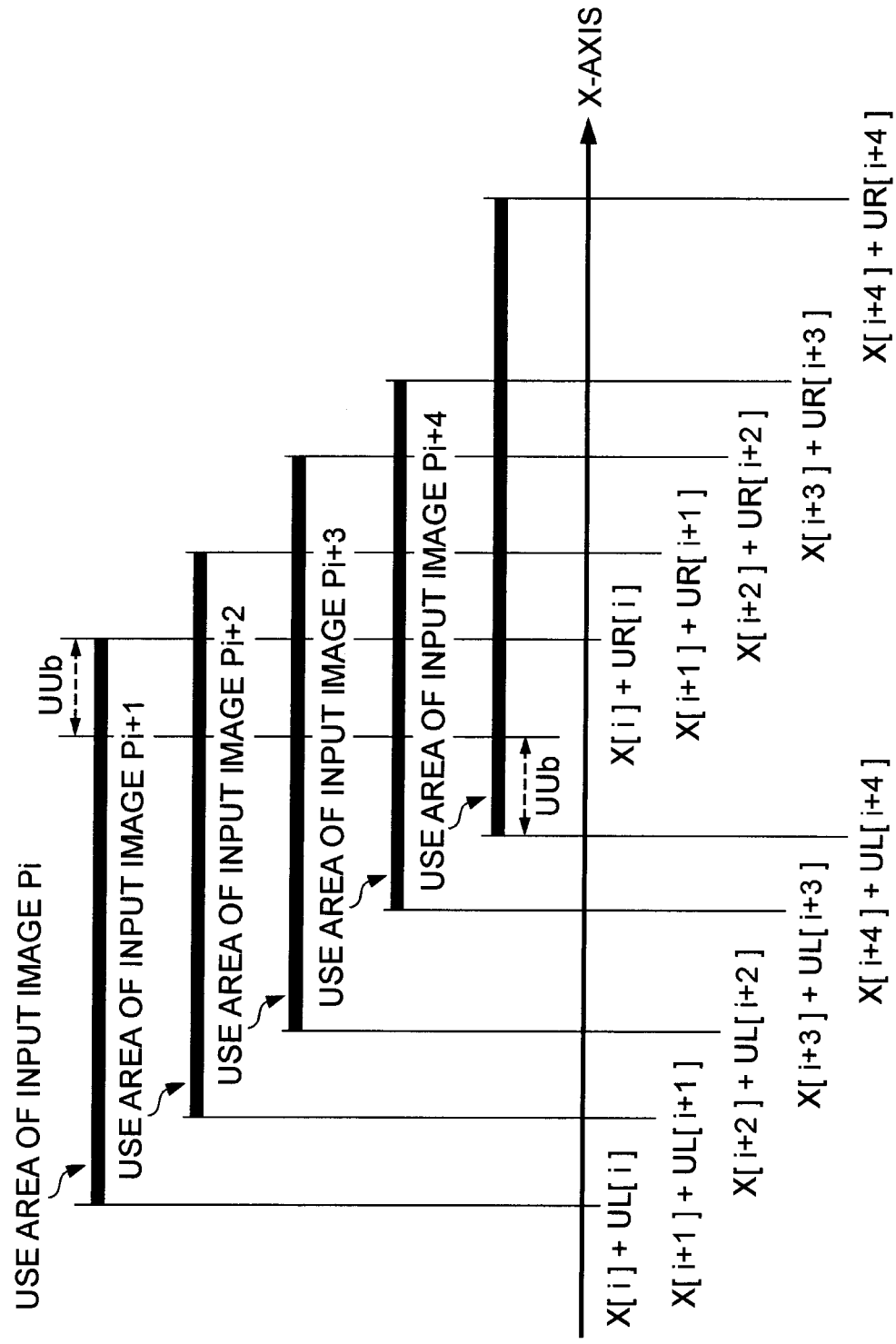
FIG. 11 is a diagram illustrating the detailed processing procedures for limiting the use area of each input image in order to the maximum number of overlapping images.
Figure 18A:
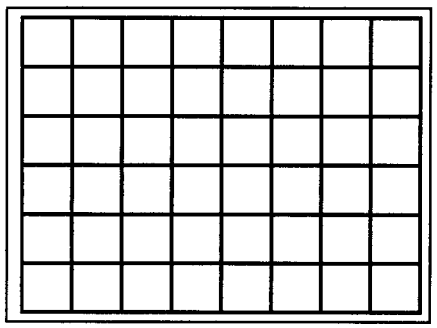
FIGS. 18A to 18C are diagrams illustrating image distortion (e.g., barrel-type distortion and pincushion-type distortion) occurring in a captured image due to lens distortion.
Figure 18B:
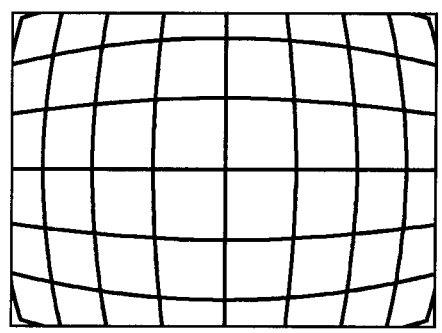
Figure 18C:
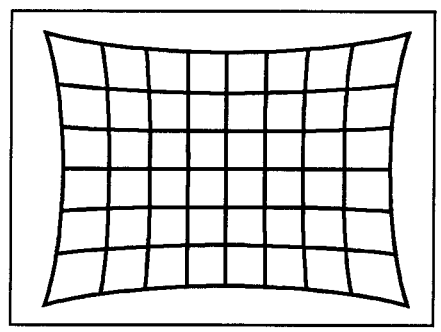

This is a countermeasure to solve Pending Problems 1 and 2 mentioned in the related art section. The detailed processing procedures will be described with reference to FIG. 11. In FIG. 11, the use areas of five input images Pi to Pi+4 which are parts of the input images are illustrated. The use area of each input image is the remaining area excluding the non-use area (elimination area) which is determined by the processing of step ST16. That is to say, the use area as used therein refers to an area between UL[i] and UR[i], an area between UL[i+1] and UR[i+1], an area between UL[i+2] and UR[i+2], an area between UL[i+3] and UR[i+3], and an area between UL[i+4] and UR[i+4], which are designated by the processing of step ST16.

The panoramic image generator 120 determines whether or not an overlap is present between the use area of the input image Pi and the use area of the input image Pi+4. When an overlap is present, the panoramic image generator 120 sets a portion of the use area of each of the input images Pi and Pi+4 as a non-use area (elimination area) UUb as illustrated in FIG. 11 so that there is no overlap.

By doing so, there will be only four images, at most, overlapping each other in the input images after the non-use area is eliminated, whereby the panoramic image Q can be generated with an appropriate number of overlapping images.

The flowchart of FIG. 12 illustrates the procedures for the processing of step ST17, specifically the processing procedures for limiting the use area of the input image in order to limit the maximum number of overlapping images.

At step ST31, the panoramic image generator 120 starts a use area limiting process, and then proceeds to repetitive processing for each i (i=1 to N−2) at step ST32. In this repetitive processing, the panoramic image generator 120 starts the processing at step ST33, and then proceeds to step ST34. At step ST34, the panoramic image generator 120 calculates tmp=(X[i]+UR[i])−(X[i+4]+UL[i+4]).

Subsequently, at step ST35, the panoramic image generator 120 determines whether the tmp has a positive value. When the tmp has a positive value, it means that an overlap is present between the use area of the input image Pi and the use area of the input image Pi+4. Therefore, when the tmp has a negative value, the panoramic image generator 120 immediately terminates the processing at step ST37 and proceeds to perform processing for the next i.

When the tmp has a positive value, the panoramic image generator 120 updates the UR[i] and UL[i+4] to UR[i]=UR[i]−(tmp/2) and UL[i+4]=UL[i+4]+(tmp/2), respectively, at step ST36. Then, the panoramic image generator 120 terminates the processing at step ST37 and proceeds to perform processing for the next i.

When the repetitive processing for each i (i=1 to N−2) at step ST32 is completed, the panoramic image generator 120 terminates the use area limiting process at step ST38.

In the above description, it has been described for the case where the maximum number of overlapping images is limited to 4. However, it can be generalized so that the maximum number of overlapping images is limited to T (T is an integer of 2 or more). The user may set the value of T in advance by operating the user operation unit 104 (see FIG. 1). The above description is an example of a case where T=4. For example, when lens distortion is larger, it is possible to reduce an image blur resulting from a positional shift of each input image due to the lens distortion by decreasing the value of T. Furthermore, when many noise components are included, it is possible to obtain an image with less noise by increasing the value of T.

Returning now to FIG. 7, subsequently, the panoramic image generator 120 proceeds to step ST18. At step ST18, the panoramic image generator 120 outputs the use area of each input image Pi (i=1 to N), specifically, UL[i] and UR[i], and then terminates the processing of this subroutine at step ST19.

As described above, according to the digital camera 100 illustrated in FIG. 1, when a priority area PARi is designated for the input image Pi at the time of generating a panoramic image Q using a plurality of input images P1 to PN, the panoramic image generator 120 of the digital signal processor 114 sets areas of the other input images overlapping the priority area as use-prohibited areas UUL and UUR (steps ST13 and ST15 in FIG. 7). Therefore, when an area in which a moving object is projected is designated by the user as a priority area PARi, for example, only one image is used for that area when generating the panoramic image Q. Thus, it is possible to prevent occurrence of an image blur such as unintended multiple exposure.

Furthermore, according to the digital camera 100 illustrated in FIG. 1, when two input images of which the sequence orders are separated by a predetermined spacing have an overlapping area, the panoramic image generator 120 of the digital signal processor 114 sets one of the overlapping areas as a use-prohibited area (steps ST16 and ST17 in FIG. 7). Therefore, the number of overlapping images of the input images to be used for generating the panoramic image Q is limited, whereby an image blur resulting from a positional shift of each input image due to the lens distortion can be reduced.

2. Modification

In the above-described embodiment, the panoramic image generator 120 performs the following first and second processes when determining the use area of each of the input images P1 to PN (step ST4 of FIG. 2). The first process is a process of setting an area of each of the other input images overlapping the priority area as a non-use area (step ST15 of FIG. 7). The second process is a process of providing a non-use area to each input image as necessary in order to limit the number of overlapping images (steps ST16 and ST17 of FIG. 7).

However, a method of determining the use area of each of the input images P1 to PN by performing any one of the first and second processes may be considered. The flowchart of FIG. 13 illustrates the processing procedures for determining the use area (UL[i] and UR[i]) of each input image Pi (i=1 to N) by performing only the first process. In the flowchart of FIG. 13, the same or corresponding steps as those in the flowchart of FIG. 7 will be denoted by the same reference numerals. In the flowchart of FIG. 13, the processes of steps ST16 and ST17 are excluded from the flowchart of FIG. 7. Since the processes of the steps in the flowchart of FIG. 13 are the same as the processes of the corresponding steps in the flowchart of FIG. 7, description thereof will be omitted.

According to the method of performing the first process (a process of setting areas of the other input images overlapping the priority area as non-use areas) at the time of determining the use area of each of the input images P1 to PN, the following advantages can be obtained. When an area in which a moving object is projected is designated by the user as a priority area, for example, only one image is used for that area when generating the panoramic image Q. Thus, it is possible to prevent occurrence of an image blur such as unintended multiple exposure.

The flowchart of FIG. 14 illustrates the processing procedures for determining the use area (UL[i] and UR[i]) of each input image Pi (i=1 to N) by performing only the second process. In the flowchart of FIG. 14, the same or corresponding steps as those in the flowchart of FIG. 7 will be denoted by the same reference numerals. In the flowchart of FIG. 14, the processes of steps ST13 and ST15 are excluded from the flowchart of FIG. 7. Since the processes of the steps in the flowchart of FIG. 14 are the same as the processes of the corresponding steps in the flowchart of FIG. 7, description thereof will be omitted.

According to the method of performing the second process (a process of providing a non-use area to each input image as necessary in order to limit the number of overlapping images) at the time of determining the use area of each of the input images P1 to PN, the following advantages can be obtained. Since the number of overlapping images of the input images to be used for generating the panoramic image Q is limited, an image blur resulting from a positional shift of each input image due to the lens distortion can be reduced.

In the above-described embodiment, although the second process includes a process of limiting the normal number of overlapping images (step ST16 of FIG. 7) and a process of limiting the maximum number of overlapping images (step ST17 of FIG. 7), a configuration where any one of the two processes is performed is possible.

Furthermore, in the above-described embodiment, it has been described in connection with the first process that the priority area is designated by the user (step ST13 of FIG. 13). However, a configuration may be considered in which a projection area of a moving object is detected from the input images P1 to PN, and an area including the moving object is automatically designated as the priority area.

Furthermore, the above-described embodiment has been described for an example in which a panoramic image Q is generated from a plurality of input images P1 to PN which is captured by performing continuous shooting while panning the camera, that is, a plurality of input images P1 to PN which is captured while shifting sequentially a shooting position in a horizontal direction. However, the direction of shifting the shooting position at the time of capturing a plurality of input images P1 to PN is not limited to the horizontal direction. The shifting direction may be a horizontal direction or other directions.

Furthermore, the above-described embodiment has been described for an example in which a panoramic image Q is generated from a plurality of input images P1 to PN by the panoramic image generator 120 within the digital signal processor 114 of the digital camera 100 under the control of the CPU 101. However, a method is also possible in which a plurality of images captured by a digital camera is transferred to a computing device, and a panoramic image is generated within the computing device. In this case, although detailed description is not provided, the use area of each of the input images P1 to PN is determined by the same process as the above-described process of the panoramic image generator 120, whereby the panoramic image Q can be properly generated within the computing device.

FIG. 15 illustrates an exemplary configuration of a computing device 200 used for generating a panoramic image.

The computing device 200 includes a CPU (central processing unit) 11, a memory 12, a display controller 13, an input device interface 14, and a network interface 15. The computing device 200 further includes an external device interface 16 and a digital camera interface 18. These components are connected to a bus 17.

A display 19 is connected to the bus 17 via the display controller 13. A keyboard (KBD) 20 and a mouse 21 are connected to the bus 17 via the input device interface 14. Moreover, a hard disk drive (HDD) 22 and a media drive 23 are connected to the bus 17 via the external device interface 16. A digital camera is connected to the bus 17 via the digital camera interface 18. Furthermore, the computing device 200 is connected to a network such as the Internet via the network interface 15.

The CPU 11 is a main controller of the computing device 200. The CPU 11 executes various applications under the control of an operating system (OS). For example, the CPU 11 is able to execute an application program for processing images which are downloaded at once from the digital camera to the hard disk drive 22. The application program has implemented therein a series of processing program for performing the above-described panoramic image generation process. The CPU 11 is interconnected to other devices by the bus 17.

The memory 12 is a storage device used for storing program codes executed by the CPU 11 and temporarily storing work data in execution. The memory 12 is configured to include both a nonvolatile memory such as a ROM and a volatile memory such as a DRAM.

The display controller 13 is a special-purpose controller that actually processes rendering commands issued by the CPU 11. The rendering data processed by the display controller 13 are written preliminarily to a frame buffer (not illustrated), for example, and are then displayed on a screen by the display 19. For example, images read from the hard disk drive 22 are displayed on a screen by the display 19, and users watch and enjoy the images.

The input device interface 14 is a device that connects a user input device such as the keyboard 20 or the mouse 21 to the computing device 200. Users are able to input commands for playing images, for example, via the keyboard 20 or the mouse 21.

The network interface 15 connects the computing device 200 to a local network such as a LAN (local area network) and a wide area network such as the Internet in accordance with predetermined communication protocols such as the Ethernet (registered trademark).

On the network, a plurality of host terminals or servers (not illustrated) is connected in a transparent state, whereby a distributed computing environment is established. On the network, services for distributing software programs or data contents are available. For example, image data can be downloaded to the hard disk drive 22 via the network from a server storing images captured by other persons.

The digital camera interface 18 is a device for taking images supplied from the digital camera into the computing device 200. The external device interface 16 is a device for connecting an external device such as the hard disk drive 22 or the media drive 23 to the computing device 200.

The hard disk drive 22 is an external storage device fixedly mounting thereon a magnetic disc as a storage carrier as is well known in the art, and is superior to the other external storage apparatuses in terms of the storage capacity and the data transfer rate. Furthermore, the hard disk drive 22 has random access capability.

The operation of placing a software program on the hard disk drive 22 in an executable state is called the "installation" of the program into a system. The hard disk drive 22 generally stores the program codes of an operating system to be executed by the CPU 11, application programs, device drivers, and the like in a non-volatile manner. For example, a series of processing programs for performing the above-described panoramic image generation process may be installed on the hard disk drive 22.

The media drive 23 is a device into which a portable medium such as a CD (Compact Disc), a MO (Magneto-Optical disc), or a DVD (Digital Versatile Disc) is loaded, and which accesses the data recording surface thereof. The portable medium is mainly used for making back-ups of software programs, data files and the like as data in computer readable formats, or for the purpose of transferring them between systems (in other words, including sales, circulation and distribution). For example, it is possible to physically circulate and distribute application programs for image processing between a plurality of devices using the portable medium.

The present application contains subject matter related to that disclosed in Japanese Priority Patent Application JP 2009-001250 filed in the Japan Patent Office on Jan. 7, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
   a first image processor configured to receive, as a sequence of images, a plurality of images which is captured by sequentially shifting a shooting position in a predetermined direction, and set a first overlapping area overlapping a priority area which is to be used preferentially in the sequence of images, as a use-prohibited area with respect to images in the sequence of images other than the first image, the images including the first overlapping area;
   a second image processor configured to set a second overlapping area of a second or third image as a use-prohibited area based on whether the second overlapping area is larger than a predetermined boundary margin, the second overlapping area overlapping the second and third images, and the second and third images having sequence orders being separated by a predetermined spacing in the sequence of images; and
   an image generator configured to generate an output image using areas of the plurality of images included in the sequence of images, excluding areas which are set as the use-prohibited areas by the first age processor and the second image processor.

2. The image processing apparatus according to claim 1, further comprising a user operation unit that enables a user to designate the priority area in an arbitrary image among the plurality of images included in the sequence of images.

3. The image processing apparatus according to claim 1, further comprising a user operation unit that enables a user to set the predetermined spacing of the sequence order.

4. An image processing method comprising:
   a first image processing step of receiving, as a sequence of images, a plurality of images which is captured by sequentially shifting a shooting position in a predetermined direction, and setting a first overlapping area overlapping a priority area which is to be used preferentially in the sequence of images, as a use-prohibited area with respect to images in the sequence of images other than the first image, the images including the first overlapping area;

a second image processing step of setting a second overlapping area of a second or third image as a use-prohibited area based on whether the second overlapping area is larger than a predetermined boundary margin, the second overlapping area overlapping the second and third images, and the second and third images having sequence orders being separated by a predetermined spacing in the sequence of images; and an image generating step of generating an output image using areas of the plurality of images included in the sequence of images, excluding areas which are set as the use-prohibited areas in the first image processing step and the second image processing step.

5. A non-transitory computer-readable medium having stored therein a program that comprises instructions for causing a computer to perform:

a first image processing function for receiving, as a sequence of images, a plurality of images which is captured by sequentially shifting a shooting position in a predetermined direction, and setting a first overlapping area overlapping a priority area which is to be used preferentially in the sequence of images, as a use-prohibited area with respect to images in the sequence of images other than the first image, the images including the first overlapping area;

a second image processing function for setting a second overlapping area of a second or third image as a use-prohibited area based on whether the second overlapping area is larger than a predetermined boundary margin, the second overlapping area overlapping the second and third images, and the second and third images having sequence orders being separated by a predetermined spacing in the sequence of images; and an image generating function for generating an output image using areas of the plurality of images included in the sequence of images, excluding areas which are set as the use-prohibited areas by the first image processing function and the second image processing function.

6. An image processing apparatus comprising:

an image processor configured to receive, as a sequence of images, a plurality of images which is captured by sequentially shifting a shooting position in a predetermined direction, and set an overlapping area overlapping a priority area which is to be used preferentially in the sequence of images, as a use-prohibited area with respect to images in the sequence of images other than the first image, the priority area selected by a user, and the images including the overlapping area, wherein the use-prohibited area set based on whether the overlapping area is larger than a predetermined boundary margin; and an image generator configured to generate an output image using areas of the plurality of images included in the sequence of images, excluding areas which are set as the use-prohibited areas by the image processor.

7. An image processing method comprising:

an image processing step of receiving, as a sequence of images, a plurality of images which is captured by sequentially shifting a shooting position in a predetermined direction, and setting an overlapping area overlapping a priority area which is to be used preferentially in the sequence of images, as a use-prohibited area with respect to images in the sequence of images other than the first image, the priority area selected by a user, and the images including the overlapping area, wherein the use-prohibited area is set based on whether the overlapping area is larger than a predetermined boundary margin; and an image generating step of generating an output image using areas of the plurality of images included in the sequence of images, excluding areas which are set as the use-prohibited areas by the image processing step.

* * * * *